United States Patent [19]
Podhorsky

[11] Patent Number: 5,007,165
[45] Date of Patent: Apr. 16, 1991

[54] METHOD OF PRODUCING A CAM SHAFT

[75] Inventor: Miroslan Podhorsky, Elisabethstrasse, Fed. Rep. of Germany

[73] Assignee: Balckeürr Aktiengesellschaft, Ratingen, Fed. Rep. of Germany

[21] Appl. No.: 575,306

[22] Filed: Aug. 30, 1990

[30] Foreign Application Priority Data

Sep. 2, 1989 [DE] Fed. Rep. of Germany ....... 3929179

[51] Int. Cl.$^5$ ............................................. B23P 15/00
[52] U.S. Cl. .................. 29/888.1; 29/421.1; 29/523; 74/567
[58] Field of Search ............... 29/888.1, 523, 421.1; 74/567; 72/58; 219/121.17, 121.38, 121.66

[56] References Cited

U.S. PATENT DOCUMENTS

| | | | |
|---|---|---|---|
| 4,597,365 | 7/1982 | Madaffer | 29/888.1 |
| 4,708,029 | 11/1987 | Vrano | 29/421.1 |
| 4,858,295 | 8/1989 | Hartnett et al. | 29/888.1 |
| 4,875,270 | 10/1989 | Kryps et al. | 29/421.1 |
| 4,880,477 | 11/1989 | Hayes et al. | 74/567 |
| 4,882,825 | 11/1989 | Nakamura | 29/888.1 |
| 4,905,538 | 3/1990 | Watanabe et al. | 74/567 |
| 4,922,785 | 5/1990 | Arnold et al. | 29/421.1 |

Primary Examiner—Howard N. Goldberg
Assistant Examiner—I. Cuda
Attorney, Agent, or Firm—Robert W. Becker & Associates

[57] ABSTRACT

A method of producing a cam shaft or a similar member that has a core pipe upon which are secured, via expansion of the core pipe, components that are spaced from one another and have a precribed position on the core pipe, with the expansion of the core pipe being effected by introducing a hydraulic fluid into the core pipe. The surface of the components that are secured on the core pipe and are made of a ductile spheroidal graphite iron or sintered material, are subjected to a mechanical abrasion and are melted via a controlled laser beam in such a way as to first slightly reduce the adhesive pressure betewwn the components and the core pipe as a consequence of the melting of the surface layer, and subsequently, after hardening of the melted layer and due to temperature equalization in the components and the core pipe, to increase the adhesive pressure to a higher value. The melting results in a ledeburitic structure having an adequate depth.

2 Claims, 2 Drawing Sheets

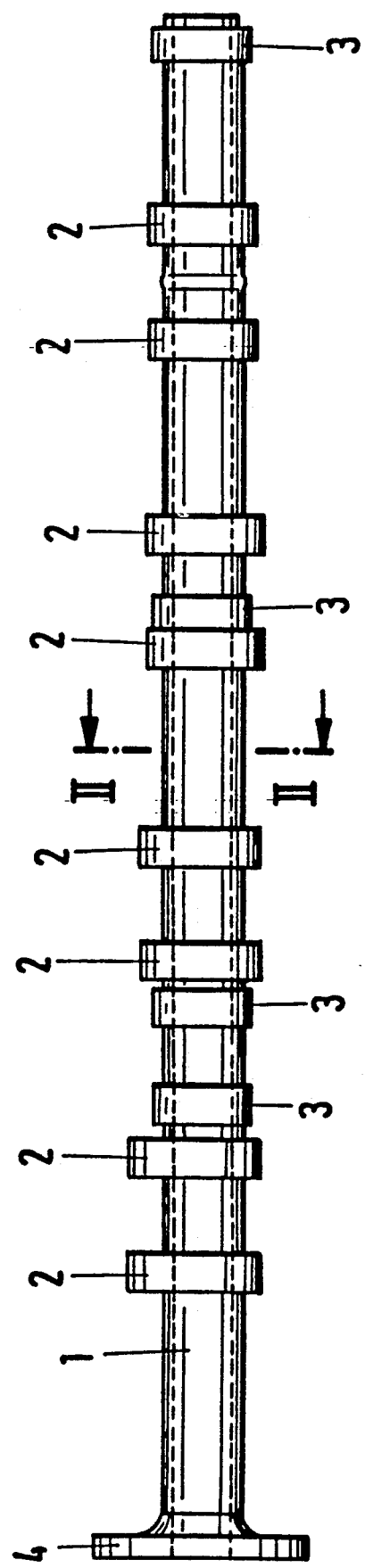
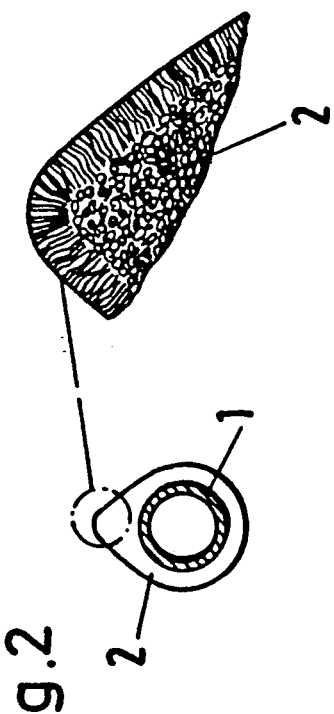

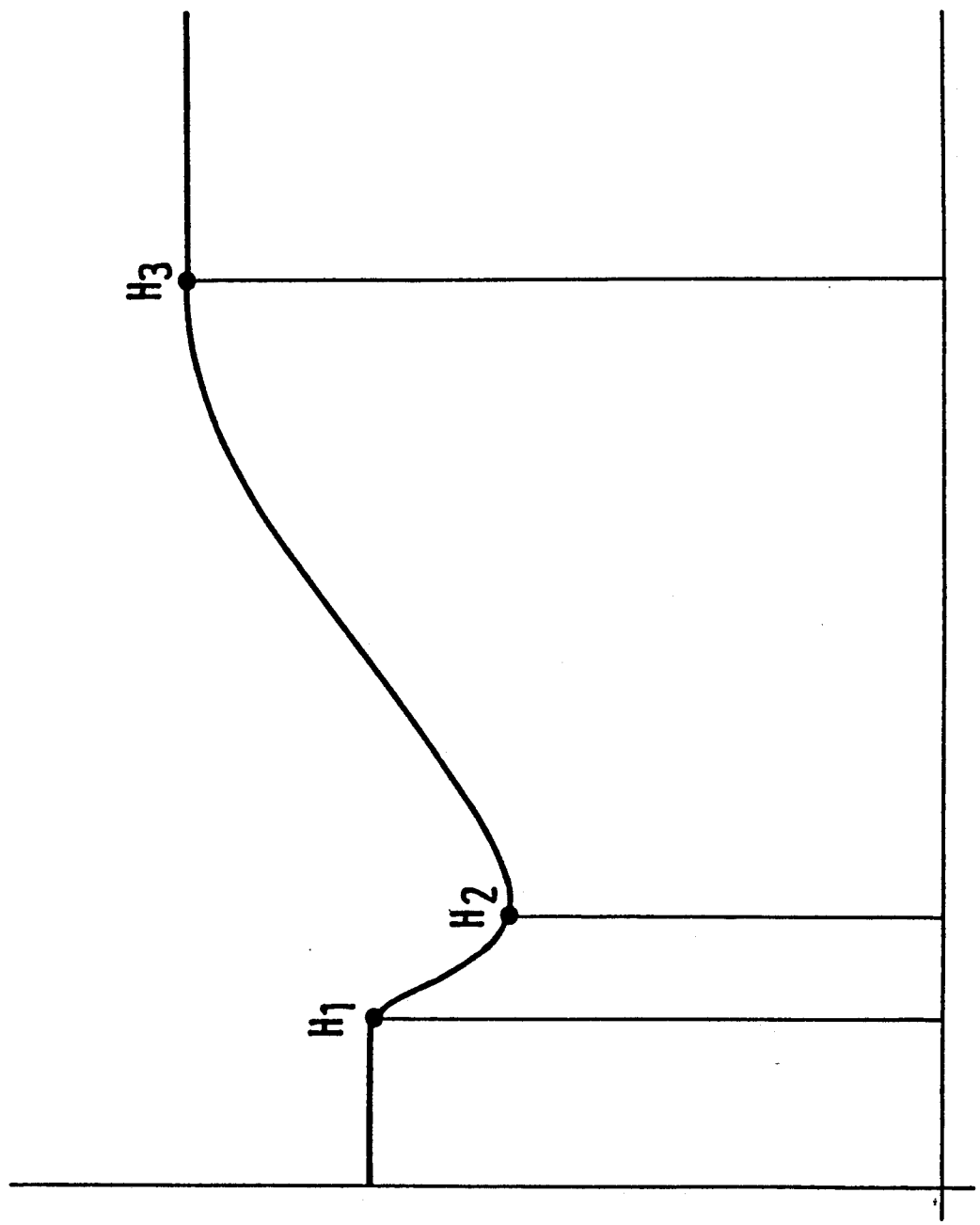

METHOD OF PRODUCING A CAM SHAFT

BACKGROUND OF THE INVENTION

The present invention relates to a method of producing a camshaft or a similar member that has a core tube or pipe upon which are secured, via expansion of the core pipe, components that are spaced from one another and have a prescribed position on the core pipe, with the expansion of the core pipe being effected by introducing a hydraulic fluid into the core pipe.

A method of this general type for producing cam shafts is known. In contrast to camshafts that are cast as an integral component, this method has the advantage that the respectively appropriate material can be selected both for the core pipe and the cams. However, when using cams or other components of cast material that are to be secured on the core pipe, difficulties arise during the securement because these cast components cannot adequately expand to the extent necessary for the heretofore known securement processes.

It is therefore an object of the present invention to provide a method of producing a camshaft or a similar member having components that are to be secured to a core pipe by expanding the core pipe by introducing hydraulic fluid therein, with the inventive method enabling a reliable securement, even of cast parts, without an appreciable elastic expansion.

BRIEF DESCRIPTION OF THE DRAWINGS

This object, and other objects and advantages of the present invention, will appear more clearly from the following specification in conjunction with the accompanying schematic drawings, in which:

FIG. 1 is a view of a camshaft produced pursuant to the inventive method;

FIG. 2 is a cross-sectional view taken along the line II—II in FIG. 1;

FIG. 3 is an enlarged view of part of the cam of FIG. 2; and

FIG. 4 is a graph in which the adhesive pressure between the cams and the core pipe is plotted against time.

SUMMARY OF THE INVENTION

The method of the present invention is characterized primarily in that the surface of the components that are secured on the core pipe, and that are made of a ductile material such as spheroidal graphite iron or sintered materials, is subjected to a mechanical abrasion and is then melted via a controlled laser beam in such a way as to first slightly reduce the adhesive pressure between the components and the core pipe as a consequence of the melting of the surface layer, and subsequently, after hardening of the melted layer and due to temperature equalization in the components and the core pipe, to increase the adhesive pressure to a higher level. Pursuant to a further feature of the present invention, a "ledeburitic" structure having an adequate depth of approximately 0.5 to 1.0 mm is formed.

With the inventive method, the advantage is achieved that even components produced via a casting process, especially cams made of ductile spheroidal graphite iron or sintered material, can be reliably secured on a core pipe. The cams are first disposed in the correct position on the hollow core pipe, and are subsequently secured thereon by expanding the core pipe by introducing hydraulic fluid therein. The surface of the cams is subsequently machined to a course finish This surface of the cams that has been subjected to a mechanical abrasion is thereafter melted via a controlled laser beam. As a consequence of this melting of the surface layer, the adhesive pressure that has resulted between the cams and the core pipe due to the expansion of the core pipe is first reduced slightly. However after hardening of the melted layer and due to temperature equalization between the cams and the core pipe, the adhesive pressure between the cams and the core pipe subsequently increases to a higher value, i.e. to a value that exceeds the original adhesive pressure generated by the expansion of the core pipe. As a result of the melting step, a "ledeburitic" structure having a particularly good resistance to wear forms in the surface of the cam to a depth of about 0.5 to 1.0 mm. The surface of the cams is subsequently machined to a fine polish.

Further specific features of the present invention will be described in detail subsequently.

DESCRIPTION OF PREFERRED EMBODIMENTS

Referring now to the drawings in detail, the camshaft shown in FIG. 1 comprises a core tube or pipe 1 on which are secured a total of eight cams 2, four bearing rings 3, and a spur gear or wheel 4. These components 2, 3, and 4 are disposed in a respectively prescribed position on the core pipe 1, which is subsequently expanded by introducing a hydraulic fluid under high pressure. In so doing an adhesive pressure $H_1$ results between each cam 2 or bearing ring 3 or spur wheel 4 on the one hand, and the core pipe 1 on the other hand, as indicated in FIG. 4.

After the surface of the cams 2, and possibly also of the bearing rings 3, has been machined to a course finish, the surface, especially of the cams 2, is now melted via a controlled laser beam. As a result of this melting of the surface layer, the adhesive pressure is first reduced slightly to the value $H_2$. However, after hardening of the melted surface layer and the resulting temperature equalization between the cams 2 and the core pipe 1, the adhesive pressure automatically increases to a value $H_3$ that is disposed at a higher level than the adhesive pressure $H_1$ that resulted after the hydraulic expansion of the core pipe. This progress of the adhesive pressure between the cams 2 and the core pipe 1 is plotted in the graph of FIG. 4 as a function of time.

In addition to the increase of the adhesive pressure between the core pipe 1 and the cams 2, the melting of the surface layer of the cams 2 results in the formation in the surface of the cams 2 of a "ledeburitic" structure having a sufficient depth, and in particular a depth of approximately 0.5 to 1.0 mm. This structure, which is indicated in FIG. 3, is particularly resistant to wear.

The present invention is, of course, in no way restricted to the specific disclosure of the specification and drawings, but also encompasses any modifications within the scope of the appended claims.

What I claim is:

1. A method of producing a member that has a core pipe upon which are secured, via expansion of said core pipe, components that are spaced from one another and have a prescribed position on said core pipe, with said expansion of said core pipe being effected by introducing a hydraulic fluid into said core pipe, said method including the further steps of:

providing components that are made of a ductile material selected from the group consisting of spheroidal graphite iron and sintered materials;
subjecting surface portions of said components to a mechanical abrasion; and
melting said surface portions of said components via a controlled laser beam in such a way as to first slightly reduce an adhesive pressure between said components and said core pipe as a consequence of said melting of said surface portions, and subsequently, after hardening of said melted surface portion and due to temperature equalization in said components and said core pipe, to increase said adhesive pressure to a higher value.

2. A method according to claim 1, which includes the step of forming, via said melting step, a ledeburitic structure having an adequate depth of about 0.5 to 1.0 mm.

* * * * *

UNITED STATES PATENT AND TRADEMARK OFFICE
CERTIFICATE OF CORRECTION

PATENT NO. : 5,007,165
DATED : Apr. 16, 1991
INVENTOR(S) : Miroslan Podhorsky

It is certified that error appears in the above-identified patent and that said Letters Patent is hereby corrected as shown below:

ON TITLE PAGE:

[73] Assignee: BALCKE-DÜRR Aktiengesellschaft, Ratingen, Fed. Rep. of Germany

Signed and Sealed this

First Day of September, 1992

Attest:

DOUGLAS B. COMER

Attesting Officer  Acting Commissioner of Patents and Trademarks